United States Patent [19]

Harkins

[11] Patent Number: 5,587,895
[45] Date of Patent: Dec. 24, 1996

[54] ELECTRICAL POWER SUPPLY WITH SINGLE OUTPUT FROM RANGE OF INPUT VOLTAGES

[76] Inventor: Michael T. Harkins, 7105 NE. Roselawn, Portland, Oreg. 97218

[21] Appl. No.: 301,941

[22] Filed: Sep. 7, 1994

[51] Int. Cl.$^6$ ........................................... H02M 7/06
[52] U.S. Cl. ................................. 363/89; 363/127
[58] Field of Search ..................... 363/80, 84, 89, 363/127, 142, 143

[56] References Cited

U.S. PATENT DOCUMENTS

| | | | |
|---|---|---|---|
| 4,641,233 | 2/1987 | Roy | 363/89 |
| 5,126,652 | 6/1992 | Carlin | 323/267 |
| 5,128,854 | 7/1992 | Raets | 363/89 |
| 5,132,893 | 7/1992 | Klein et al. | 363/49 |

Primary Examiner—Peter S. Wong
Assistant Examiner—Adolf Berhane
Attorney, Agent, or Firm—Olson & Olson

[57] ABSTRACT

An electric power supply that accommodates a wide range of input voltages utilizes a half wave rectifier connected to the input of a MOSFET switching transistor the output of which is connected to a power supply filter capacitor and a zener diode voltage regulator. A fold-back transistor is connected to the zener diode and is operable upon conduction of the zener diode to turn on just enough to cause the switching transistor to turn off just enough to maintain the voltage set by the zener diode and maintain the charge on the power supply filter capacitor. A latch transistor is connected to the MOSFET transistor and is operable during conduction of the fold-back transistor to cause the switching transistor to turn off. During the negative half cycle of the source voltage to the half wave rectifier, the power supply is turned off and the capacitor supplies all of the voltages and current to the circuit.

6 Claims, 1 Drawing Sheet

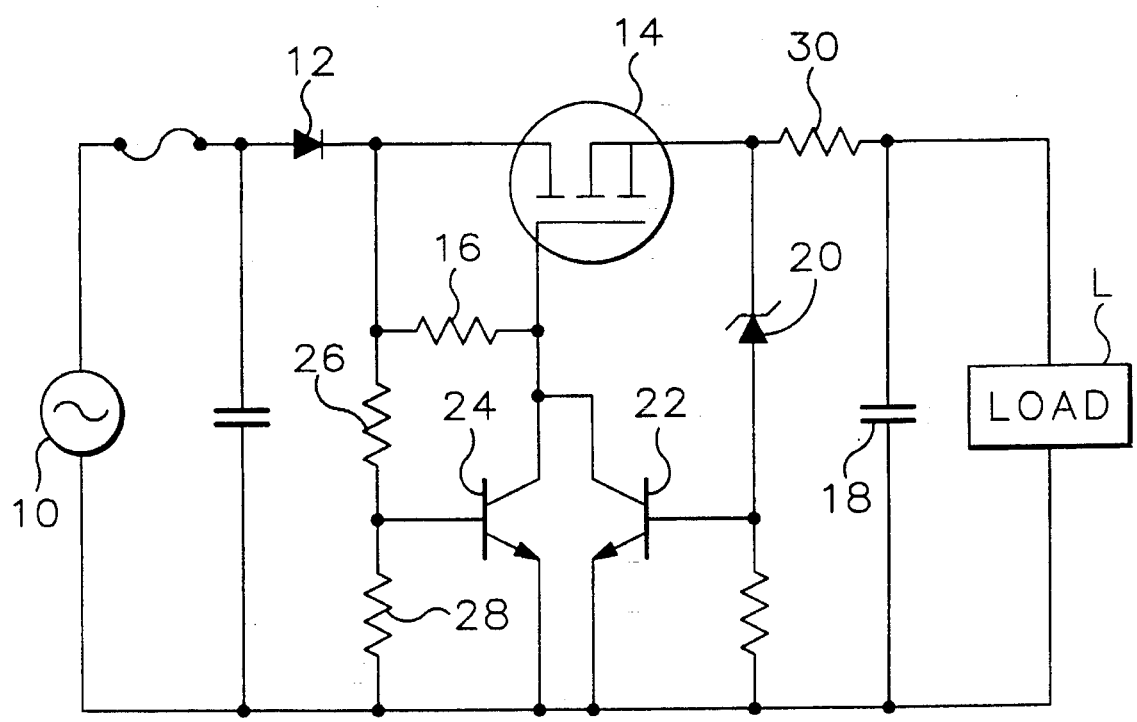

ELECTRICAL POWER SUPPLY WITH SINGLE OUTPUT FROM RANGE OF INPUT VOLTAGES

BACKGROUND OF THE INVENTION

This invention relates to electrical power supplies, and more particularly to an electrical power supply that accommodates a wide range of input voltages.

It is conventional industrial practice to provide multiple input voltages by dedicated multiple primary windings or series/parallel configurations of a transformer. This is exemplified in the article "How To Specify Power Transformer and Filter Ratings" on pages 20 and 21 of Transformer Catalog F-1, published by Signal Transformer Company on 16 Jan. 1989. These are expensive constructions and can only address one or two input voltage ranges.

It is also conventional practice to provide multiple input voltages by voltage reduction by input impedance. A resistor or capacitor is used as a series impedance to drop the input voltage to a usable level. This utilizes low efficiency high power dropping resistances to dissipate the excess power. It affords a limited input voltage range and incurs high power dissipation. This is exemplified by Motorola O-Voltage Controller UAA 106B disclosed by Motorola Semi-Conductor Technical Data in DL128 REV.3 First Quarter 1990, pages 4–134 and 4–135.

In another practice, disclosed in U.S. Patent No. 4,389,702 switching power supplies reduce the input voltage by an expensive combination of a transformer and active switching circuitry.

Efforts have been made to provide a power supply with electronic circuitry by which a range of input voltages is processed to produce a predetermined output voltage. This type of power supply is described in "Power Supplies Go Solid State" by Robert Burnett and Charles A. Little, Design News 65–89, pages 179; 180; 181; and 182. The cost of manufacture is quite high and the structures afford only a limited input voltage range.

SUMMARY OF THE INVENTION

This invention provides an electric power supply in which the positive-going side of a half wave rectified input alternating current waveform of any voltage within a wide range is applied to a MOSFET variable voltage divider to supply charging current to a power supply filter capacitor to a magnitude determined by the conduction of a zener diode which activates a fold-back transistor sufficiently to turn off the MOSFET to maintain a predetermined output voltage.

It is the principal objective of this invention to provide a single output power supply from a multiplicity of input voltages, which avoid the aforementioned disadvantages and limitations of the prior art supplies.

Another objective of this invention is to provide an electric power supply of the class described which provides a single predetermined output voltage from a wide range of input voltages.

A further objective of this invention is to provide an electric power supply of the class described which is well suited for temperature and other industrial controls and is of simplified construction for economical manufacture, maintenance and repair.

The foregoing and other objectives and advantages of this invention will appear from the following detailed description, taken in connection with the accompanying drawing of a preferred embodiment.

BRIEF DESCRIPTION OF THE DRAWING

The single FIGURE is a schematic diagram of an electrical circuit embodying the features of this invention.

DESCRIPTION OF THE PREFERRED EMBODIMENT

Stated broadly, the universal input voltage power supply of this invention is an electric power supply designed to run on a wide range of input voltages, e.g. between 24 VAC and 277 VAC. It uses active components to simply turn itself off when it does not need any more power. This allows for minimum power dissipation within the control.

The universal input voltage power supply of this invention is best described by the operation of the electrical circuit shown in the drawing. Basically, the power supply is a half wave rectifier supply, produced by delivering the input AC source 10 through diode rectifier 12. Thus, there are created positive and negative half wave direct current waveforms at the input potential of source 10.

When the positive half cycle input waveform from diode 12 starts to rise, the MOSFET switching transistor 14 starts to turn on through resistor 16. The high gain of the MOSFET allows for down sizing of components to minimize power dissipation at the upper level of the input range, e.g. 277 VAC, while still allowing operation at the lower level of the input range, e.g. 24 VAC.

The MOSFET thus starts supplying current, charging up main supply filter capacitor 18 toward the regulating voltage which is set by zener diode 20. When that voltage is reached, zener diode 20 starts to conduct, thereby starting fold-back transistor 22 to turn on just enough to cause the MOSFET 14 to turn off just enough that it maintains the voltage set by zener diode 20 and maintains the charge on capacitor 18.

As the input voltage continues to rise, the MOSFET transistor 14 continues to supply enough current to maintain the charge on capacitor 18 and maintain its regulation of fold-back transistor 22. The latch transistor 24 begins to conduct, thereby causing the MOSFET transistor to turn off fully, allowing no current through it and thus no power dissipation. The point at which the latch transistor latches is set through resistors 26 and 28. Current regulating resistor 30 interconnects the high voltage MOSFET switching transistor 14 and the low voltage regulating zener diode 20 and current storage capacitor 18, and operates upon activation of the MOSFET transistor to cause the low voltage regulating zener diode to double as a current regulator, sufficiently to maintain the predetermined electric current to the electric load L.

On the falling edge of the positive half cycle of the input voltage from diode 12, the latch transistor 24 drops out of conduction, allowing the MOSFET transistor to regulate at the voltage set by zener diode 20. During the negative half cycle of the AC source 10, the power supply is off and the main filter capacitor 18 supplies all of the voltage and current to the rest of the circuit, including load L.

From the foregoing it will be apparent that this invention provides an electric power supply which is of simplified and therefore economical construction, and which accommodates a wide range of input voltages with minimum power dissipation.

It will be apparent to those skilled in the art that modifications and changes may be made in the circuit configuration described hereinbefore without departing from the spirit of this invention and the scope of the appended claims.

I claim:

1. An electric power supply, comprising:
   a) half wave rectifier means having an input arranged for connection to a source of alternating current potential having a magnitude within a wide range of magnitudes, and an output providing positive half wave waveforms at the magnitude of the source potential,
   b) a current storage capacitor arranged for connection across an electric load to be supplied with a predetermined electric potential and current,
   c) high voltage switching means interconnecting the rectifier means and current storage capacitor,
   d) low voltage regulating means interconnecting the current storage capacitor and high voltage switching means and operable to regulate the voltage to the current storage capacitor at said predetermined electric potential,
   e) low voltage control means interconnecting the high voltage switching means and low voltage regulating means and operable upon activation of the low voltage regulating means to deactivate the high voltage switching means sufficiently to main the predetermined electric potential through the high voltage switching means to the electric load, and
   f) resistive current regulating means interconnecting the high voltage switching means, low voltage regulating means and current storage capacitor and operable upon activation of the high voltage switching means to cause the low voltage regulating means to double as a current regulating means sufficiently to main the predetermined electric current to the electric load.

2. The electric power supply of claim 1 wherein the high voltage switching means is a MOSFET transistor.

3. The electric power supply of claim 1 wherein the low voltage regulating means includes a zener diode.

4. The electric power supply of claim 1 wherein the control means comprises a low voltage latch transistor and resistor divider connected to the high voltage switching means and operable to deactivate the high voltage switching means to minimize the power dissipation of the high voltage switching means.

5. An electric power supply comprising:
   a) half wave rectifier means having an input arranged for connection to a source of alternating current potential having a magnitude within a wide range of magnitudes, and an output for delivering positive half wave waveforms at the potential of the source,
   b) a power supply filter capacitor arranged for connection across a load to be supplied with a predetermined electric potential,
   c) a MOSFET switching transistor interconnecting the output of the rectifier means and the capacitor,
   d) zener diode regulator means connected to the output of the MOSFET switching transistor and operable to regulate the voltage to the filter capacitor at said predetermined electric potential,
   e) a fold-back transistor connected to the zener diode regulator means and operable upon activation of the zener diode regulator means to turn off the MOSFET switching transistor sufficiently to maintain the predetermined electric potential, and
   f) a latch transistor connected to the MOSFET transistor and operable upon activation to deactivate the MOSFET transistor and operable upon deactivation to allow activation of the MOSFET transistor to regulate at said predetermined electric potential.

6. An electric power supply, comprising:
   a) half wave rectifier means having an input arranged for connection to a source of alternating current potential having a magnitude within a wide range of magnitudes, and an output providing positive half wave waveforms at the magnitude of the source potential,
   b) a power supply filter capacitor arranged for connection across an electric load to be supplied with a predetermined electric potential,
   c) a MOSFET switching transistor interconnecting the rectifier means and capacitor,
   d) a zener diode voltage regulator interconnecting the capacitor and switching transistor and operable to regulate the voltage to the capacitor at said predetermined electric potential, and
   e) control means including a fold-back transistor interconnecting the MOSFET switching transistor and zener diode voltage regulator and operable upon activation of the zener diode voltage regulator to turn off the MOSFET switching transistor sufficiently to maintain the predetermined electric potential to the electric load, and a latch transistor connected to the MOSFET transistor and operable upon activation to deactivate the MOSFET transistor and operable upon deactivation to allow actuation of the MOSFET transistor to regulate at said predetermined electric potential.

* * * * *